United States Patent
Ivanov et al.

(10) Patent No.: US 11,706,082 B1
(45) Date of Patent: Jul. 18, 2023

(54) RECONCILIATION OF CLOUD SERVICE STATE

(71) Applicant: Microsoft Technology Licensing, LLC, Redmond, WA (US)

(72) Inventors: Volodymyr Ivanov, Bellevue, WA (US); Bert Casper, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/591,325

(22) Filed: Feb. 2, 2022

(51) Int. Cl.
*H04L 41/0654* (2022.01)
*H04L 43/045* (2022.01)
*H04L 67/10* (2022.01)

(52) U.S. Cl.
CPC ........ *H04L 41/0654* (2013.01); *H04L 43/045* (2013.01); *H04L 67/10* (2013.01)

(58) Field of Classification Search
CPC .... H04L 41/0654; H04L 43/045; H04L 67/10
See application file for complete search history.

(56) References Cited

U.S. PATENT DOCUMENTS

| | | | |
|---|---|---|---|
| 7,421,493 B1 * | 9/2008 | Adams .................... | H04L 43/00 709/224 |
| 8,812,586 B1 | 8/2014 | Kulkarni et al. | |
| 9,887,889 B1 * | 2/2018 | Dippenaar .............. | H04L 43/20 |
| 11,449,354 B2 * | 9/2022 | Fu ........................ | G06F 9/45541 |
| 2004/0267823 A1 | 12/2004 | Shapiro et al. | |
| 2008/0307258 A1 | 12/2008 | Challenger et al. | |
| 2013/0173539 A1 | 7/2013 | Gilder et al. | |
| 2017/0206359 A1 | 7/2017 | Harper et al. | |
| 2021/0042325 A1 | 2/2021 | Goldberg et al. | |

OTHER PUBLICATIONS

Lei, Zhang, "Fundamentals of Declarative Application Management in Kubernetes", Retrieved from: https://www.alibabacloud.com/blog/fundamentals-of-declarative-application-management-in-kubernetes_596265, Jun. 3, 2020, 10 Pages.
Price, et al., "Event Sourcing Pattern", Retrieved from: https://docs.microsoft.com/en-us/azure/architecture/patterns/event-sourcing, Nov. 12, 2021, 11 Pages.
"International Search Report and Written Opinion Issued in PCT Application No. PCT/US22/048334", dated Feb. 2, 2023, 12 Pages.

* cited by examiner

*Primary Examiner* — Cheikh T Ndiaye
(74) *Attorney, Agent, or Firm* — Workman Nydegger

(57) ABSTRACT

A computer system is configured to perform a reconciliation process with respect to a current state of a cloud service and a goal state of the cloud service. Performing the reconciliation process includes obtaining the current state of the cloud service, obtaining the goal state of the cloud service, evaluating the current state against the goal state to generate a reconciliation plan that comprises a plurality of operations, and starting execution of the reconciliation plan at the cloud service including performing at least one of the plurality of operations in the reconciliation plan. In response to detecting an event, the computer system reperforms the reconciliation process again such that one or more current state, the goal state, or the reconciliation plan changes.

20 Claims, 9 Drawing Sheets

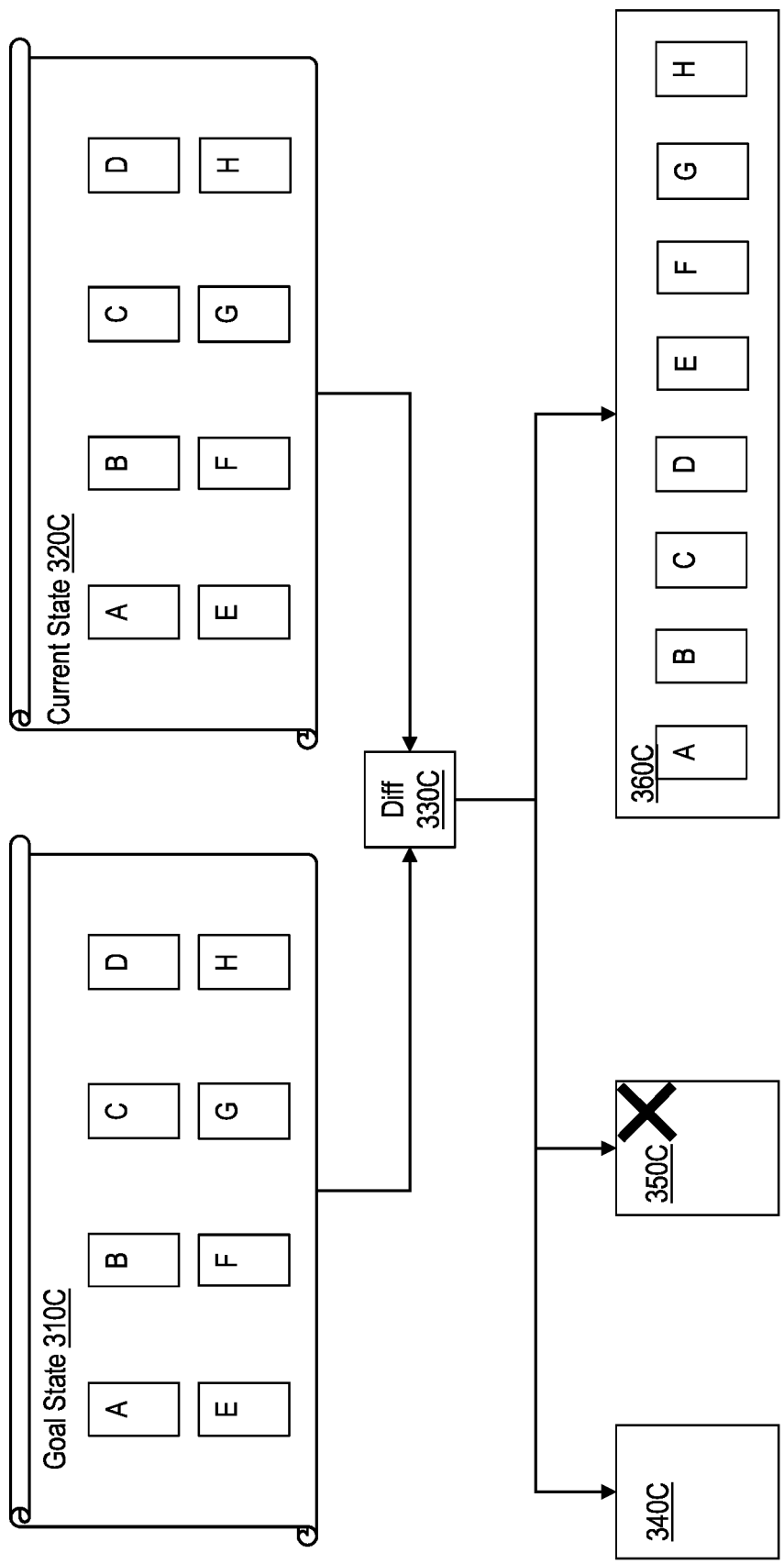

RECONCILIATION OF CLOUD SERVICE STATE

BACKGROUND

Unlike traditional software development and operation practices, where a collection of software updates were integrated into one large batch and deployed in a new version of the software, modern-day software development and operation practices involve continuous development, continuous testing, continuous integration, continuous deployment, and continuous monitoring of software applications throughout its development life cycle. A combination of such practices, including continuous integration (CI), continuous delivery, and/or continuous deployment (CD), are often called CI/CD. CI/CD bridges the gaps between deployment and operation activities and teams by enforcing automation in the building, testing, and deployment of applications. CI/CD compiles the incremental code changes made by developers, then link and package them into software deliverables. CI/CD increases early defect discovery and productivity, and provides faster release cycles.

A cloud service is a software application that processes data and performs computations in a cloud in a secure fashion. When a cycle of CI/CD in a cloud service is to be performed, a process of integration and deployment, including a sequence of operations, is performed at the cloud. Existing cloud service platforms often include a portal for engineers to perform the sequence of operations. In some cases, a first cloud service is set up to work with a second cloud service, which may be (are but not limited to) machine-learning cloud services provided by other service providers. In such a case, resources for the first cloud service are first set up in a cloud, which is then configured to work with the second cloud service. These resources are maintained by constantly redeploying, including delete actions, update actions that are needed by the machine-learning services.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

The embodiments described herein are related to a computer system configured to perform a reconciliation process with respect to a current state of a cloud service and a goal state of the cloud service. Performing a reconciliation process with respect to a current state of a cloud service and a goal state of the cloud service includes obtaining the current state of the cloud service and obtaining the goal state of the cloud service. The current state contains one or more resources that have been deployed at the cloud service. The goal state contains one or more resources required to set up and run the cloud service. Performing the reconciliation process also includes evaluating the current state against the goal state to generate a reconciliation plan that comprises a plurality of operations. Obtaining the goal state and current state of the cloud service and evaluating the current state against the goal state to generate a reconciliation plan provides a technical effect of more accurately and timely deploying and/or updating the cloud service compared to traditional methods and allowing the cloud service to self-evaluate, and self-improve.

In some embodiments, detecting the event includes detecting at least one of (1) at least one of a plurality of operations is finished, (2) a new goal state is identified, or (3) a predetermined time has passed. In some embodiments, in response to identifying a new goal state before a current reconciliation process is completed, the computer system is configured to abort the current reconciliation process, and start a new reconciliation process to reconcile a current state of the cloud service with the new goal state. As such, the cloud service saves its resources and time, preventing itself from continuously performing out-of-date operations in an out-of-date reconciliation process, which furthers the technical effect.

In some embodiments, evaluating the current state against the goal state includes comparing a first set of resources that have been deployed at the cloud service with a second set of resources contained in the goal state to identify (1) a third set of resources that have not been deployed at the cloud service, but contained in the goal state, (2) a fourth set of resources that have been deployed at the cloud service, but not contained in the goal state, or (3) a fifth set of resources that have been deployed at the cloud service, and also contained in the goal state. Based on the third set of resources, the fourth set of resources, and the fifth set of resources, the plurality of operations are identified. The plurality of operations are then evaluated to identify dependencies thereof.

A reconciliation graph is then generated based on the plurality of operations and the dependencies thereof. In some embodiments, after the reconciliation graph is generated, a subset of operations in the reconciliation graph that are without any dependency are then identified. In some embodiments, executing the reconciliation plan at the cloud service includes launching the subset of operations at the cloud service asynchronously. Asynchronously executing only the subset of operations that are without any dependency eliminates dependency-related failure and improves the efficiency of operations, which brings about a further technical effect.

In some embodiments, asynchronously executing the subset of operations at the cloud service includes asynchronously launching the subset of operations as sub-processes at the cloud service, and tracking and maintaining a state for each operation in the subset of operations at the cloud service. Tracking and maintaining a state for each operation allows the cloud service to keep a record of its current state, making a continuous reconciliation faster and more efficient, which brings about a further technical effect. Additionally, the tracking of the goal state and/or current state of a cloud service is reproducible and can be applied to new regions immediately without having to perform additional work, which improves the performance, reduces resource consumption, and reduces defect of cloud service deployment.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIGS. 3A-3C illustrate example recursive diff operations for comparing a current state of a cloud service with a goal state;

DETAILED DESCRIPTION

Figure 1:
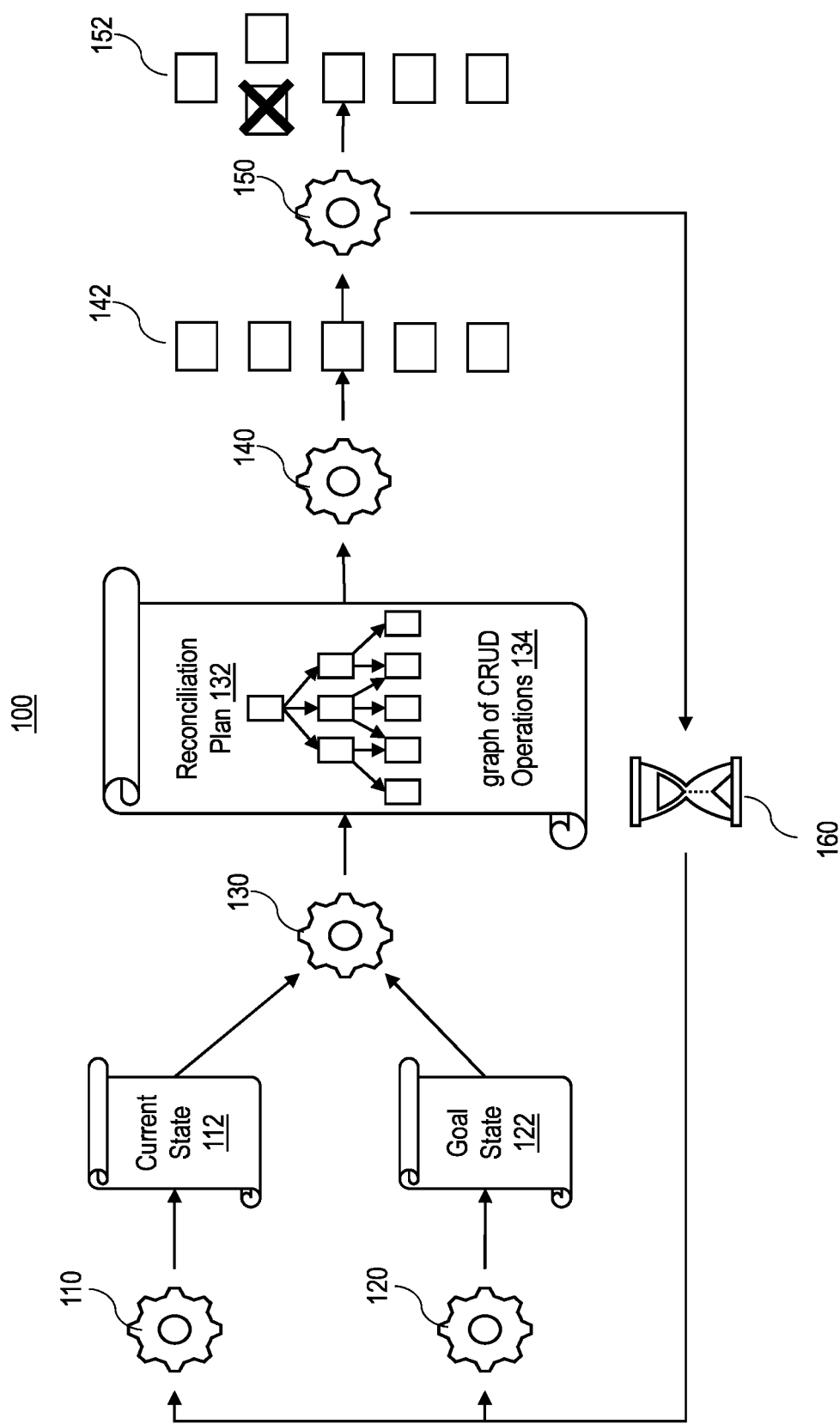
FIG. 1 illustrates an example process of reconciliation of a current state of a cloud service with a goal state.

Modern-day software development and operation practices involve continuous development, continuous testing, continuous integration, continuous deployment, and continuous monitoring of software applications throughout their development life cycle. A combination of such practices, including continuous integration (CI), continuous delivery, and/or continuous deployment (CD), are often called CI/CD. CI/CD bridges the gaps between deployment and operation activities and teams by enforcing automation in the building, testing, and deployment of applications. CI/CD compiles the incremental code changes made by developers, then link and package them into software deliverables. CI/CD increases early defect discovery and productivity, and provides faster release cycles.

A cloud service is a software application that processes data and perform computations in a cloud in a secure fashion. When a cloud service is to be deployed and/or updated, a process of integration and deployment including a sequence of operations is performed at the cloud. Existing cloud service platforms often includes a portal for engineers to perform the sequence of operations. In many cases, a first cloud service is set up to work with a second cloud service, which may be (are but not limited to) machine-learning cloud services provided by other service providers. In such a case, resources for the first cloud service are first set up in a cloud, which is then configured to work with the second cloud service, such as machine-learning cloud services. These resources are maintained by constantly redeploying, including delete actions, update actions that are needed by the machine-learning services.

As another example, after an existing cloud service has been deployed in a first region, a second cloud service now needs to be deployed in a second region. After the second cloud service is deployed, the two cloud services often need to be updated and maintained simultaneously. In existing cloud service platforms, deploying and maintaining such cloud services using automation is generally not possible.

The principles described herein solve the above-described problem by introducing a new type of computer-implemented process (also referred to as a "reconciliation process") that automatically and recursively detects a goal state of a cloud service and reconciles a current state of the cloud service with the goal state. The reconciliation process brings about a technical effect of making it possible to automatically and timely deploy and update a cloud service in a continuous manner.

Performing a reconciliation process with respect to a current state of a cloud service and a goal state of the cloud service includes obtaining the current state of the cloud service and obtaining the goal state of the cloud service. The current state contains one or more resources that have been deployed at the cloud service. The goal state contains one or more resources required to set up and run the cloud service. Performing the reconciliation process also includes evaluating the current state against the goal state to generate a reconciliation plan that comprises a plurality of operations. Obtaining the goal state and current state of the cloud service and evaluating the current state against the goal state to generate a reconciliation plan provides a technical effect of more accurately and timely deploying and/or updating the cloud service compared to traditional methods and allowing the cloud service to self-evaluate, and self-improve.

Thereafter, the reconciliation plan is executed upon the cloud service. Execution of the reconciliation plan at the cloud service includes performing at least one of the plurality of operations in the reconciliation plan. In response to detecting an event, the computer system reperforms the reconciliation process again, such that one or more of (1) the current state of the cloud service, (2) the goal state of the cloud service, and/or (3) the reconciliation plan changes. By repeatedly performing the reconciliation process, the cloud service moves step by step towards the goal state.

In some embodiments, detecting the event includes detecting at least one of (1) at least one of a plurality of operations is finished, (2) a new goal state is identified, or (3) a predetermined time has passed. In some embodiments, in response to identifying a new goal state before a current reconciliation process is completed, the computer system is configured to abort the current reconciliation process, and start a new reconciliation process to reconcile a new current state of the cloud service with the new goal state.

In some embodiments, the computer system is further configured to obtain a first set of operations that are executing at the cloud service, and a second set of operations contained in the reconciliation plan to identify (1) a second set of operations that are in the first set of operations but not in the reconciliation plan, and/or (2) a third set of operations that are common in both the first set of operations and the reconciliation plan. The reconciliation plan further includes (1) canceling the second set of operations, and/or (2) keeping the third set of operations.

As such, the cloud service saves its resources and time, preventing itself from continuously performing out-of-date operations in an out-of-date reconciliation process, which furthers the technical effect.

In some embodiments, evaluating the current state against the goal state includes comparing a first set of resources that have been deployed at the cloud service with a second set of resources contained in the goal state to identify (1) a third set of resources that have not been deployed at the cloud service, but contained in the goal state, (2) a fourth set of resources that have been deployed at the cloud service, but not contained in the goal state, or (3) a fifth set of resources that have been deployed at the cloud service, and also contained in the goal state. Based on the third set of resources, the fourth set of resources, and the fifth set of resources, the plurality of operations are identified. For example, in some embodiments, the plurality of operations include creating the fourth set of resources, deleting the fifth set of resource, etc. The plurality of operations are then evaluated to identify dependencies thereof.

A reconciliation graph is then generated based on the plurality of operations and the dependencies thereof. In some embodiments, the reconciliation graph is a directed acyclic graph (DAG) having a plurality of nodes and a plurality of edges. Each of the plurality of nodes of the DAG is one of create, read, update, or delete (CRUD) operations, and each of the plurality of edges of the DAG is a dependency between operations connected thereby. In some embodiments, the reconciliation graph is optimized to generate an optimized reconciliation graph. The optimized reconciliation graph is then used to identify the subset of the operation. Optimizing the reconciliation graph allows the further processing of the reconciliation graph faster and more efficient, which brings about a further technical effect.

In some embodiments, after the reconciliation graph is generated, a subset of operations in the reconciliation graph that are without any dependency are then identified. In some embodiments, executing the reconciliation plan at the cloud service includes launching the subset of operations at the cloud service asynchronously.

Notably, because the set of operations may have some dependencies, certain operations need to be performed before others. Running the plurality of operations without identification of their dependencies would cause certain operations to fail due to their pre-requisite operations (being depended thereon) having not been completed. Asynchronously executing only the subset of operations that are without any dependency eliminates such a type of failure and improves the efficiency of operations, which brings about a further technical effect.

In some embodiments, asynchronously executing the subset of operations at the cloud service further includes tracking and maintaining a state for each operation in the subset of operations at the cloud service. In some embodiments, the computer system is further configured to cause the cloud service to produce a first set of states for the first set of operations executing at the cloud service and memorize the first set of states in a first cache. A state for each operation in the first set of operations is associated with a time-to-live and a taint flag. Obtaining the current state includes obtaining the first set of states from the first cache, and determining whether at least one state in the first set of states has been expired based on the time-to-live or has been tainted based on the taint flag. In response to determining that at least one state in the first set of states has been expired or tainted, the computer system causes the cloud service to produce a new state for a corresponding operation and memorize the new state in the first cache. In some embodiments, the computer system is further configured to taint the taint flags of the first set of states that would be impacted by executing the subset of operations.

Tracking and maintaining a state for each operation allows the cloud service to keep a record of its current state, making a continuous reconciliation faster and more efficient, which brings about a further technical effect. Additionally, the tracking of the goal state and/or current state of a cloud service is reproducible and can be applied to new regions immediately without having to perform additional work, which improves the performance, reduces resource consumption, and reduces defect of cloud service deployment.

In some embodiments, the goal state is a current state of a second cloud service. For example, an existing cloud service has been deployed in an existing region, and the same cloud service now needs to be deployed in a new region. The existing cloud service is an example of a second cloud service.

In some embodiments, the computer system is further configured to cause the second cloud service to produce a second set of states for the second set of operations executing at the second cloud service and memorize the second set of states in a second cache. Similarly, in some embodiments, a state for each operation is associated with a time-to-live and a taint flag. Obtaining the goal state includes obtaining the second set of states from the second cache, and determining whether at least one state in the second set of states has been expired based on the time-to-live or whether at least one state in the second set of states has been tainted based on the taint flag. In response to determining that at least one state in the second set of states has been expired or tainted, the computer system causes the second cloud service to produce a new state for a corresponding operation and memorize the new state in the second cache. As such, the embodiments described herein allow a first cloud service to be synchronized with another cloud service automatically, which furthers the technical effect.

FIG. 1 illustrates an example of a reconciliation process 100 that reconciles a current state of a cloud service with a goal state. The reconciliation process brings about a technical effect of making it possible to automatically and timely deploy and update a cloud service in a continuous manner. The process 100 is performed at a computer system. As illustrated in FIG. 1, reconciling the current state of the cloud service with the goal state includes obtaining (act 120) a current state 112, and obtaining (act 110) the goal state 122. The current state contains one or more resources that have been deployed at the cloud service, and the goal state contains one or more resources required to set up and run the cloud service. In some cases, the goal state 122 is entered manually using a high-level programming language, such as TypeScript. In some cases, the goal state 122 is a current state of a second cloud service. For example, an existing cloud service has been deployed in an existing region, and the same cloud service now needs to be deployed in a new region. The existing cloud service is an example of a second cloud service.

The goal state 122 and the current state 112 are then evaluated (act 130) against each other to generate a reconciliation plan 132. The reconciliation plan 132 identifies a reconciliation graph 134. In some embodiments, the reconciliation graph 134 is a directed acyclic graph (DAG) having a plurality of nodes and a plurality of edges. In some embodiments, each of the plurality of nodes of the DAG is one of create, read, update, or delete (CRUD) operations, and each of the plurality of edges of the DAG is a dependency between operations connected thereby. In some embodiments, the reconciliation graph is optimized to generate an optimized reconciliation graph. Obtaining the goal state and current state of the cloud service and evaluating the current state against the goal state to generate a reconciliation plan provides a further technical effect of allowing the cloud service to self-evaluate, and self-improve. Optimizing the reconciliation graph allows the further processing of the reconciliation graph faster and more efficient, which brings about a further technical effect.

In some embodiments, a subset of operations 142 in the reconciliation graph 134 are identified (act 140) as being without any dependency, and the subset of operations 142 (that are without any dependency) are then asynchronously launched (act 150). Asynchronously executing only the subset of operations that are without any dependency eliminates such a type of failure and improves the efficiency of operations, which brings about a further technical effect.

In some embodiments, a second subset of operations in the reconciliation graph 134 are identified as not needed, and the second subset of operations are canceled. The operations 152 represent the currently running or canceling operations in the reconciliation plan 132. As such, the cloud service saves its resources and time, preventing itself from continuously performing out-of-date operations in an out-of-date reconciliation process, which furthers the technical effect.

In some embodiments, the process 100 further includes waiting (act 160) for a plurality of events. In response to detecting at least one of the plurality of events, the computer system reconciles the current state of the cloud service with the goal state 122 again. In some embodiments, the plurality of events include at least one of (1) operations 152 are finished, (2) a new goal state is identified, or (3) a predetermined time (such as, but not limited to, 1 minute, 2 minutes, 5 minutes, or 10 minutes) has passed.

In some embodiments, in response to detecting a new goal state before a current reconciliation process is completed, the computer system is configured to abort the current reconciliation process and start a new reconciliation process to reconcile the current state of the cloud service with the new goal state.

Figure 2:
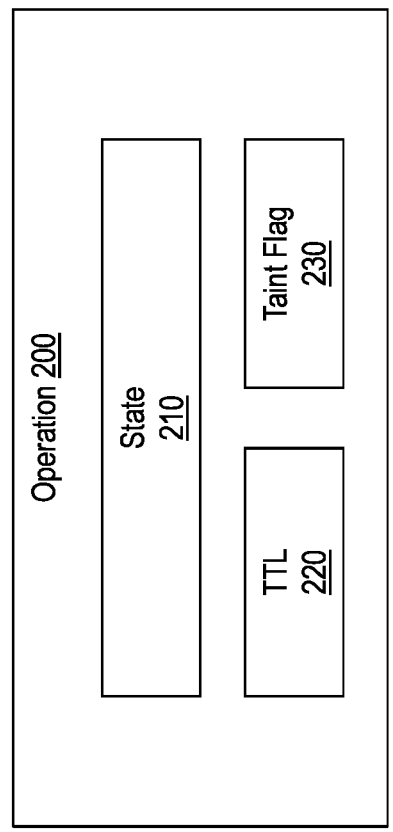
FIG. 2 illustrates an example data structure of a state of an operation that is executing at a cloud service.

In some embodiments, the cloud service is also configured to record a state for each operation in the reconciliation plan. In some embodiments, each state of the operation is associated with a time-to-live (TTL) and a taint flag. The TTL indicates an expiration time for each state of the operation. The taint flag indicates whether the state is to be changed. FIG. 2 illustrates an example data structure that memorizes a state of an operation 200. As illustrated in FIG. 2, the state of the operation 200 includes a state 210, a TTL 220, and a taint flag 230. The cloud service is caused to obtain the first set of states and memorize the first set of states in a first cache. Tracking and maintaining a state for each operation allows the cloud service to keep a record of its current state, making a continuous reconciliation faster and more efficient, which brings about a further technical effect.

In some embodiments, obtaining (act 120) the current state further includes obtaining the first set of states from the first cache, and determining whether at least one state in the first set of states has been expired based on the TTL or has been tainted based on the taint flag. In response to determining that at least one state in the first set of states has been expired or tainted, the computer system causes the cloud service to produce a new state for a corresponding operation and memorize the new state in the first cache. In some embodiments, the taint flags of the subset of operations 142 in the reconciliation graph 134 that would be impacted by executing thereof are marked as tainted.

In some embodiments, the goal state 122 is a current state of a second cloud service. For example, an existing cloud service has been deployed in an existing region, and the same cloud service now needs to be deployed in a new region. The existing cloud service is an example of a second cloud service. In some embodiments, the second cloud service is also caused to maintain states of operations performed thereon.

In some embodiments, obtaining (act 110) the goal state includes obtaining a second set of resources that have been deployed at the second cloud and/or a second set of states from a second cache, and determining whether at least one state in the second set of states has been expired based on the TTL or whether at least one state in the second set of states has been tainted based on the taint flag. In response to determining that at least one state in the second set of states has been expired or tainted, the second cloud service is caused to produce a new state for a corresponding operation and memorize the new state in the second cache.

In some embodiments, the act 130 of evaluating the current state 112 (containing a first set of resources) and the goal state 122 (containing a second set of resources) against each other includes performing a comparison (e.g., a diff operation) to identify (1) a third set of resources that have not been deployed at the cloud service, but contained in the goal state 122, (2) a fourth set of resources that have been deployed at the cloud service, but not contained in the goal state 122, or (3) a fifth set of resources that have been deployed at the cloud service, and also contained in the goal state 122. The third set of resources, the fourth set of resources, and the fifth set of resources are then analyzed to identify a plurality of operations that are to be performed at the cloud service to bring the cloud service to the goal state 122. For example, in some embodiments, the plurality of operations include creating the third set of resources, deleting the fourth set of resources, etc. The plurality of operations are then evaluated to identify the dependencies thereof. The reconciliation graph 134 is then generated based on the plurality of operations and the dependencies thereof.

In some embodiments, the act 130 of evaluating the goal state 122 and the current state 112 against each other further include includes performing a comparison between the current state 112 (that is currently executing a first set of operations) and the reconciliation plan 132 (containing a second set of operations) to identify at least one of (1) a third set of operations that are currently not executing at the cloud service, but are contained in the reconciliation plan 132, (2) a fourth set of operations that are currently executing at the cloud service, but are not contained in reconciliation plan 132, or (3) a fifth set of operations that are currently executing at the cloud service and also contained in the reconciliation plan 132. In some embodiments, the third set of operations are canceled, the fourth set of operations are executed, and/or the fifth set of operations are kept.

Figure 3A:
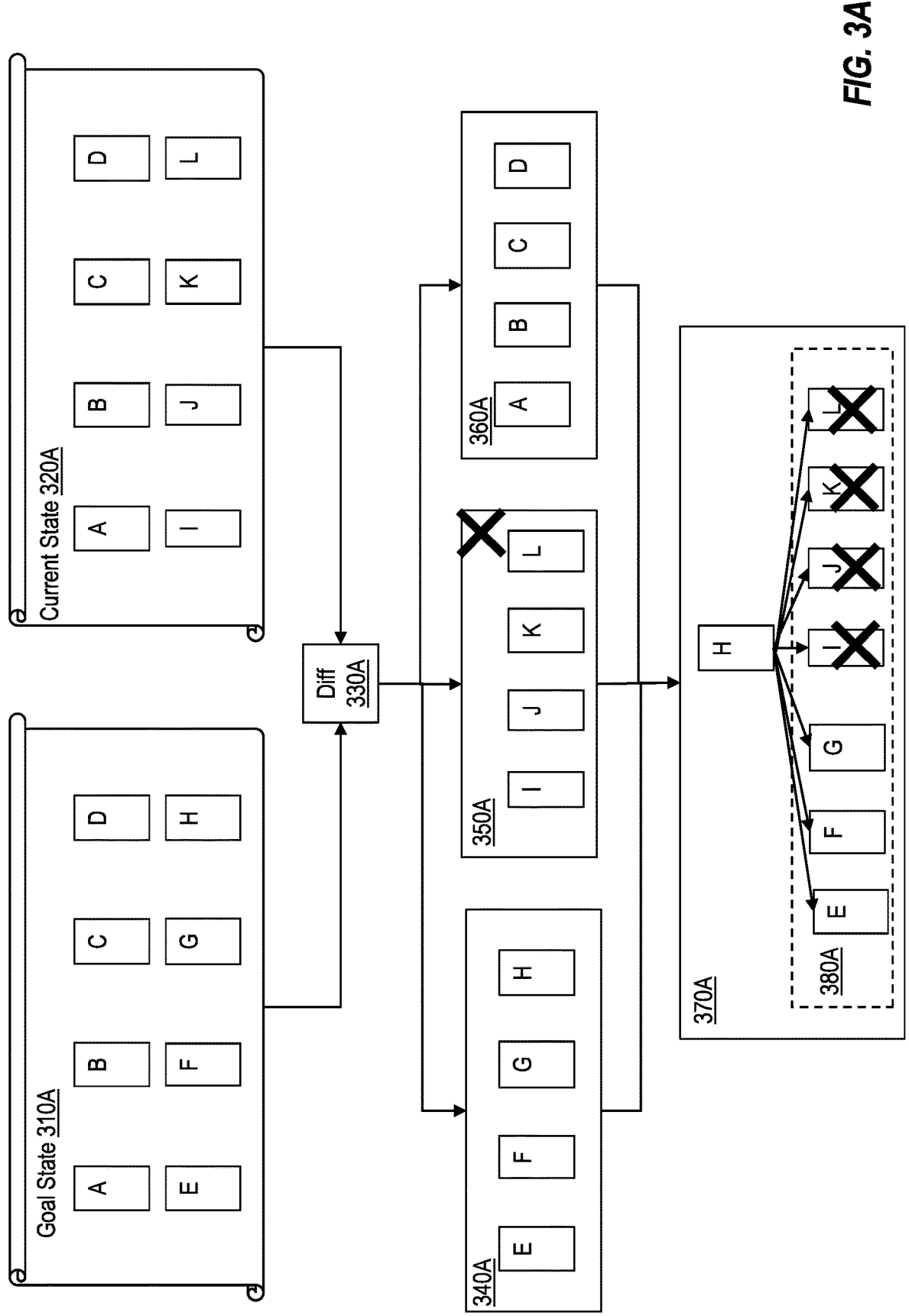
Figure 3B:
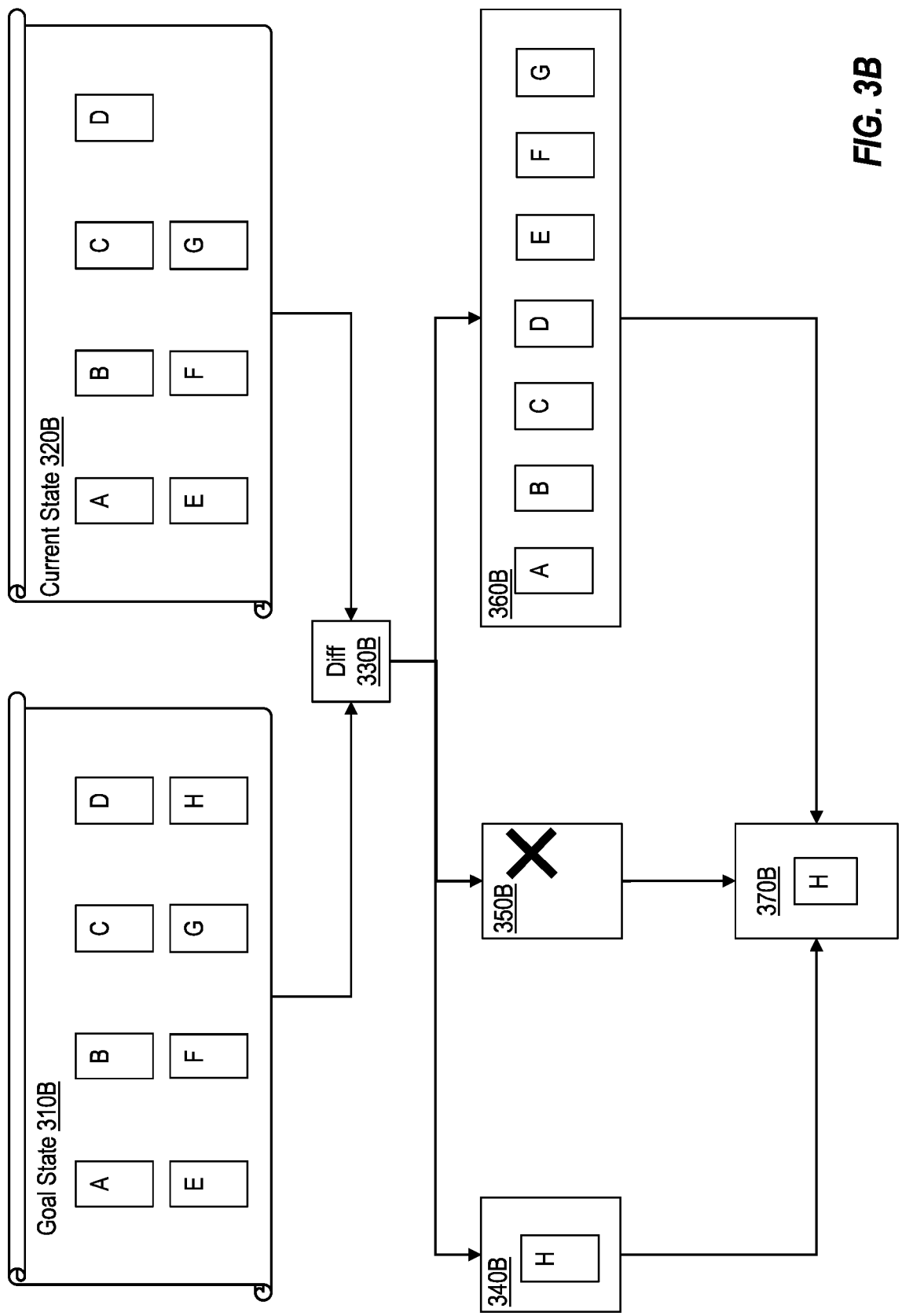

FIGS. 3A-3C further illustrate example diff operations comparing a current state of a cloud service against a goal state. Referring to FIG. 3A, a current state 320A (corresponding to the current state 112 of FIG. 1) contains a first set of resources A, B, C, D, I, J, K, L that have been deployed at a cloud service. A goal state 310A (corresponding to the goal state 122 of FIG. 1) contains a second set of resources for a second set of resources A, B, C, D, E, F, G, H. A diff operation 330A is performed between the goal state 310A and current state 320A to identify (1) a third set of resources 340A (including resources E, F, G, H) that is not deployed or to be deployed at the cloud service, but are contained in the goal state 310A, (2) a fourth set of resources 350A (including resources I, J, K, L) that is deployed or to be deployed at the cloud service, but are not contained in the goal state 310A, and/or (3) a fifth set of resources 360A (including A, B, C, D) that have been deployed or to be deployed at the cloud service and also contained in the goal state 310A.

Next, a set of operations and dependencies thereof are identified based on the third set of resources 340A, the fourth set of resources 350A, and the fifth set of resources 360A. For example, the set of operations includes creating the third set of resources 340A, and deleting the fourth set of resources 350A. A reconciliation graph 370A is then generated based on the set of operations and the dependencies thereof. Based on the reconciliation graph 370A, a subset of operations 380A that are without dependencies in the reconciliation graph 370A are identified. As illustrated, the reconciliation graph 370A includes an operation of creating H, which depends from three operations of creating E, F, G, and the operations of deleting I, J, K, L; and the operations of creating E, F, G, and deleting I, J, K L are without dependencies. As such, the operations of creating E, F, G, and deleting I, J, K L form the subset of operations 380A.

In embodiments, the operations (e.g., operation of creating H) that are with dependencies are simply discarded in the current cycle of reconciliation. Although, some of these operations (that are with dependencies now) may no longer have dependencies in a next cycle of reconciliation. In such a case, some of these operations will be launched in the next cycle of reconciliation. This process can repeat as many times as necessary to eventually cause all the operations in the graph 370A to be launched and finished. Notably, since the subset of operations 380A are without dependencies, they can be asynchronously launched.

Referring back to FIG. 1, the process 100 also includes waiting (act 160) for a plurality of events. In response to detecting at least one of the plurality of events, the computer system reconciles the state of the cloud service with the goal state again. In some embodiments, the plurality of events include at least one of (1) operations 152 are finished, (2) a new goal state is identified, or (3) a predetermined time (such as 1 minute, 2 minutes, 5 minutes, or 10 minutes) has passed.

Assuming that when the execution of the subset of the operations 380A is completed, no new goal state was identified, and the predetermined time has not passed, in response to the completion of the execution of the operations 380A in FIG. 3A, a new reconciliation process starts, and a new diff operation is performed between the goal state and the updated current state. FIG. 3B illustrates an example diff operation 330B performed between a goal state 310B (which is the same as 310A of FIG. 3A) and a current state 320B (which is the state after the completion of the operations 380A of FIG. 3A).

Similar to the process illustrated in FIG. 3A, the diff operation 330B is performed between the goal state 310B and current state 320B to identify (1) a third set of resources 340B (including resource H) that are currently not executing at the cloud service, but are contained in the goal state 310B, (2) a fourth set of resources 350B (no resource in this case) that are currently executing at the cloud service, but are not contained in the goal state 310B, and/or (3) a fifth set of resources 360B (including A, B, C, D, E, F, G) that have been deployed at the cloud service and also contained in the goal state 310B.

Again, a third set of operations are identified based on the third set of resources 340B, the fourth set of resources 350B, and the fifth set of resources 360B, and a reconciliation graph 370B is generated. Based on the reconciliation graph 370B, a subset of operations that are without dependencies in the reconciliation graph 370B are identified. In this case, since there is only one operation (creating H) in the reconciliation graph 370B, the operation of creating H is without dependency. The operation of creating H is therefore executed.

Again, assuming that when the execution of the reconciliation plan is completed, no new goal state was identified, and the predetermined time has not passed, in response to the completion of the execution of the reconciliation plan in FIG. 3B, a new reconciliation process starts, and a new diff operation is performed between the goal state and the updated current state. FIG. 3C illustrates an example diff operation 330C performed between a goal state 310C (which is the same as 310A or 310B of FIG. 3A or 3B) and a current state 320C (which is the state after the reconciliation process of FIG. 3B).

Notably, the goal state 310C and the current state 320C are identical now. Thus, the diff operation 330C would generate (1) an empty third set of resources 340C, (2) an empty fourth set of resources 350C, and (3) a full fifth set of resources 360C that include all the operations in the current state 320C. The reconciliation plan would be keeping all the resources in the current state 320C as they are, and do nothing.

In some embodiments, after the current state 320C is fully reconciled with the goal state 310C, the computer system continuously wait (act 160) for a plurality of events, such as (but not limited to) a new goal state is identified, or a predetermined time (such as 1 minute, 2 minutes, 5 minutes, or 10 minutes) has passed. In response to detecting at least one of the plurality of events, the computer system reconciles the current state of the cloud service with the goal state again.

In some embodiments, when a new goal state is identified, it immediately supersedes a previous goal state. As such, a new reconciliation process is performed between the new goal state and the current state, and a delta between the new goal state and the previous goal state is not used for the reconciliation process. However, in some embodiments, the delta is computed for validating changes to the goal state as they come in from various sources. For example, the delta can be used to determine whether the reconciliation process passes safety tests and/or any other customizable policy checks. If the reconciliation process did not pass the safety tests and/or the customizable policy checks, errors are detected, and a new reconciliation process can be performed, or an alert can be generated to notify service operators. As another example, the delta can also be used as a mechanism to inform service operators about goal state changes, and the goal state changes can then be used in an audit process.

The above-described process can be implemented at a cloud computing service, such as (but not limited to) AZURE®, for application management. In some embodiments, the following pseudo commands are performed at the cloud computing service to achieve the reconciliation process between a goal state and a current state.

1. Scan The cloud computing service:
2. Scan the cloud computing service environment to produce a dump of the current state.
3. Each scanned item is memorized (cached) with a TTL and a taint flag attached to it.
4. Scan will scan items that don't exist, items that have an expired TTL and/or a tainted flag.
5. Retrieve goal state:
6. Pull the latest goal state from storage.
7. Analyze diffs and create a reconciliation plan:

8. Compare the cloud computing service state to the last known goal state, produce differences.
9. Analyze dependencies and produce the reconciliation plan—a directed acyclic graph where nodes are CRUD operations, and edges are dependencies between those operations constraining the order of execution.
10. Take operations without dependencies:
11. Select operations from the plan which do not depend on anything and throw away the rest of the reconciliation plan.
12. Asynchronously launch new operations, cancel unneeded:
    13. Compare the list of running operations with the current list.
    14. Cancel currently running operations that are not needed anymore.
        practically wait for completion for most of those.
        but also actively cancel if they don't complete in time.
    15. Do nothing with the operations which are supposed to be running.
16. Asynchronously execute operations:
    17. Taint The cloud computing service cache components that would be impacted by the operation.
    18. Asynchronously launch operations as sub-processes (see process isolation).
        NOTE: operations continue to run asynchronously
    19. Track and maintain operational status.
20. Wait for the new event, one of:
    21. the asynchronous operation is completed.
    22. a new goal state is available.
    23. a predetermined time (at most 10 minutes) has passed.
24. Start over again: Go to 1

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4:
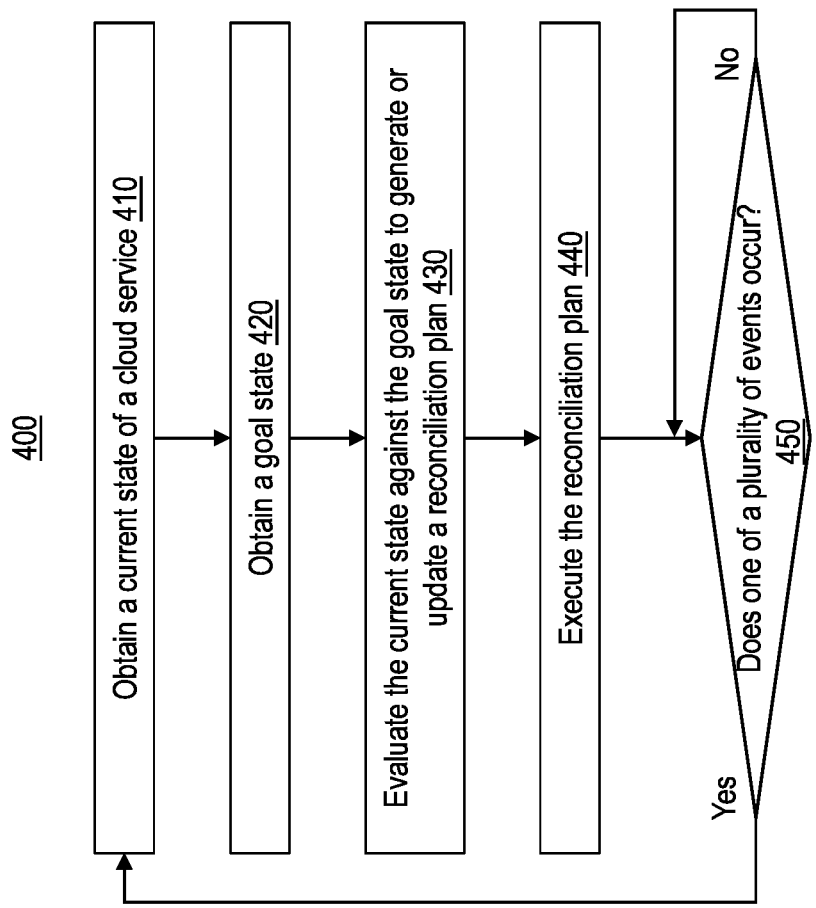
FIG. 4 illustrates a flowchart of an example method 400 for reconciliation of a current state of a cloud service with a goal state.

FIG. 4 illustrates a flowchart of an example method 400 for reconciliation of a current state of a cloud service with a goal state. The method 400 includes obtaining a current state of a cloud service (act 410). The current state contains a first set of resources that have been deployed at the cloud service. The method 400 also includes obtaining a goal state (act 420). The goal state contains a second set of resources that are required to set up and run the cloud service. The method 400 further includes evaluating the current state against the goal state to generate a reconciliation plan that comprises a plurality of operations (act 430). The reconciliation process brings about a technical effect of making it possible to automatically and timely deploy and update a cloud service continuously. The reconciliation plan is then executed upon the cloud service (act 440).

The method 400 also includes waiting for a plurality of events (act 450). In some embodiments, the plurality of events include at least one of (1) the at least one operation in the third set of operations is finished, (2) a new goal state is identified, or (3) a predetermined time (such as, but not limited to, 1 minute, 2 minutes, 5 minutes, or 10 minutes) has passed. In response to determining that at least one of the plurality of events occurs, acts 410-450 are repeated again. In some embodiments, in response to detecting a new goal state before a current reconciliation process is completed, the current reconciliation process is aborted, and a new reconciliation process is started to reconcile a current state of the cloud service with the new goal state. Note, in embodiments described herein, the new goal state is not compared with the previous goal state. Instead, the current state is compared with the new goal state. As such, the cloud service saves its resources and time, preventing itself from continuously performing out-of-date operations in an out-of-date reconciliation process, which furthers the technical effect.

Figure 5:
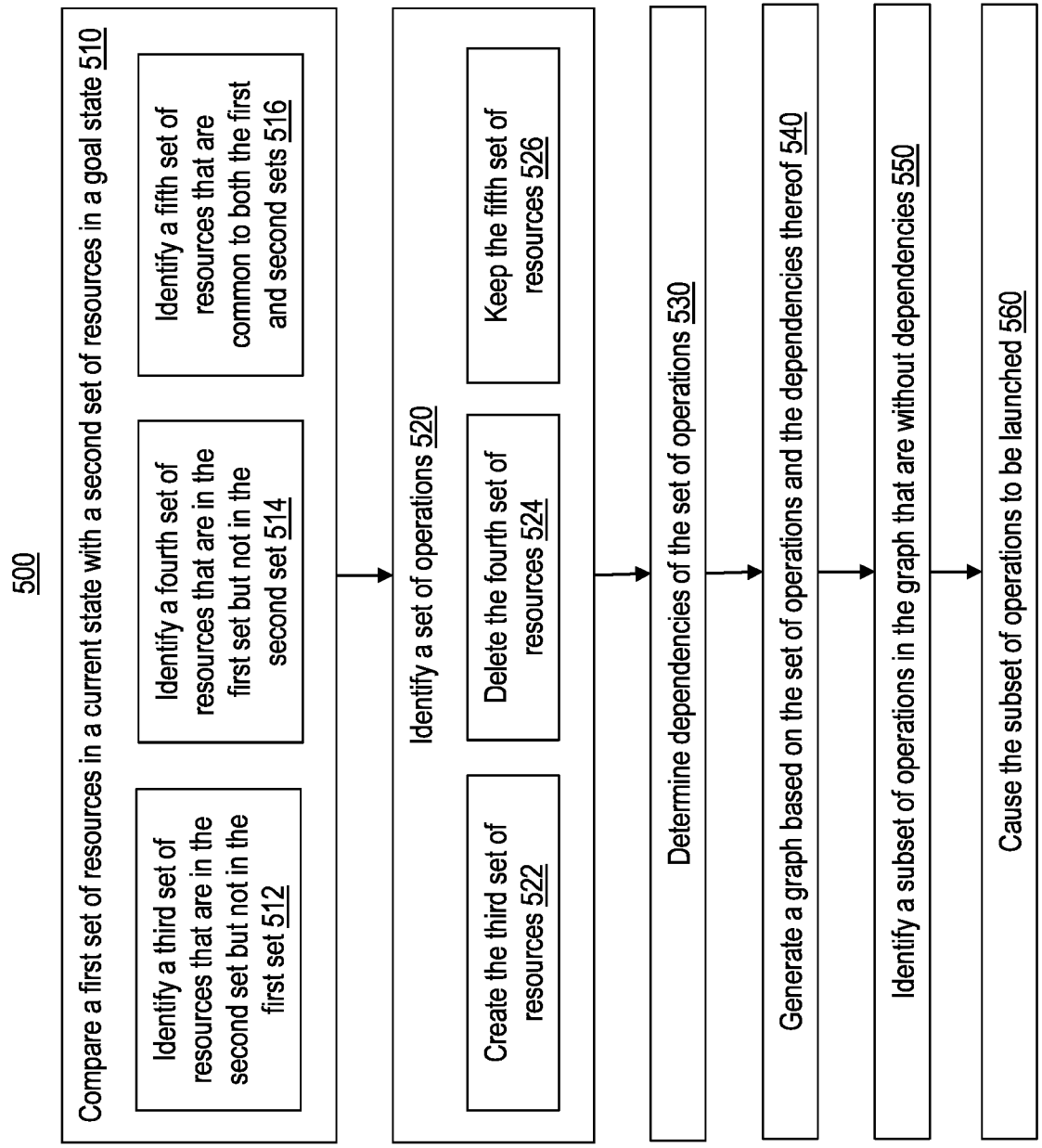
FIG. 5 illustrates a flowchart of an example method for evaluating the current state against a goal state to generate a reconciliation plan.

FIG. 5 illustrates a flowchart of an example method 500 for evaluating a current state against a goal state to generate a reconciliation plan, which corresponds to act 430 of FIG. 4. The method 500 includes comparing a first set of resources in a current state with a second set of resources in a goal state (act 510). In some embodiments, act 510 includes identifying a third set of resources that are in the second set of resources, but not in the first set of resources (act 512). In some embodiments, act 510 also includes identifying a fourth set of resources that are in the first set of resources, but not in the second set of resources (act 514). In some embodiments, act 510 also includes identifying a fifth set of resources that are common to both the first set of resources and the second set of resources (act 516).

In some embodiments, the method 500 also include identifying a set of operations based on the third set of resources, the fourth set of resources, and the fifth set of resources (act 520). In some embodiments, the set of operations includes creating a third set of resources at the cloud service (522), deleting the fourth set of resources in the fourth set of resources at the cloud service 524, and/or keeping the fifth set of resources at the cloud service (526). The method 500 also includes determining dependencies of the set of operations (act 530) and generating a reconciliation graph based on set of operations and the dependencies thereof (act 540). In some embodiments, a subset of operations in the graph that are without dependencies are identified (550), and only the subset of operations are caused to be lunched (act 560). Asynchronously executing only the subset of operations that are without any dependency eliminates such a type of failure and improves the efficiency of operations, which brings about a further technical effect.

In some embodiments, the reconciliation graph is a directed acyclic graph (DAG) having a plurality of nodes and a plurality of edges. Each of the plurality of nodes of the DAG is one of create, read, update, or delete (CRUD) operations, and each of the plurality of edges of the DAG is a dependency between operations connected thereby. In some embodiments, the reconciliation graph is optimized to generate an optimized reconciliation graph. The optimized reconciliation graph is then used to identify the subset of the operation. Optimizing the reconciliation graph allows the further processing of the reconciliation graph faster and more efficient, which brings about a further technical effect.

Figure 6:
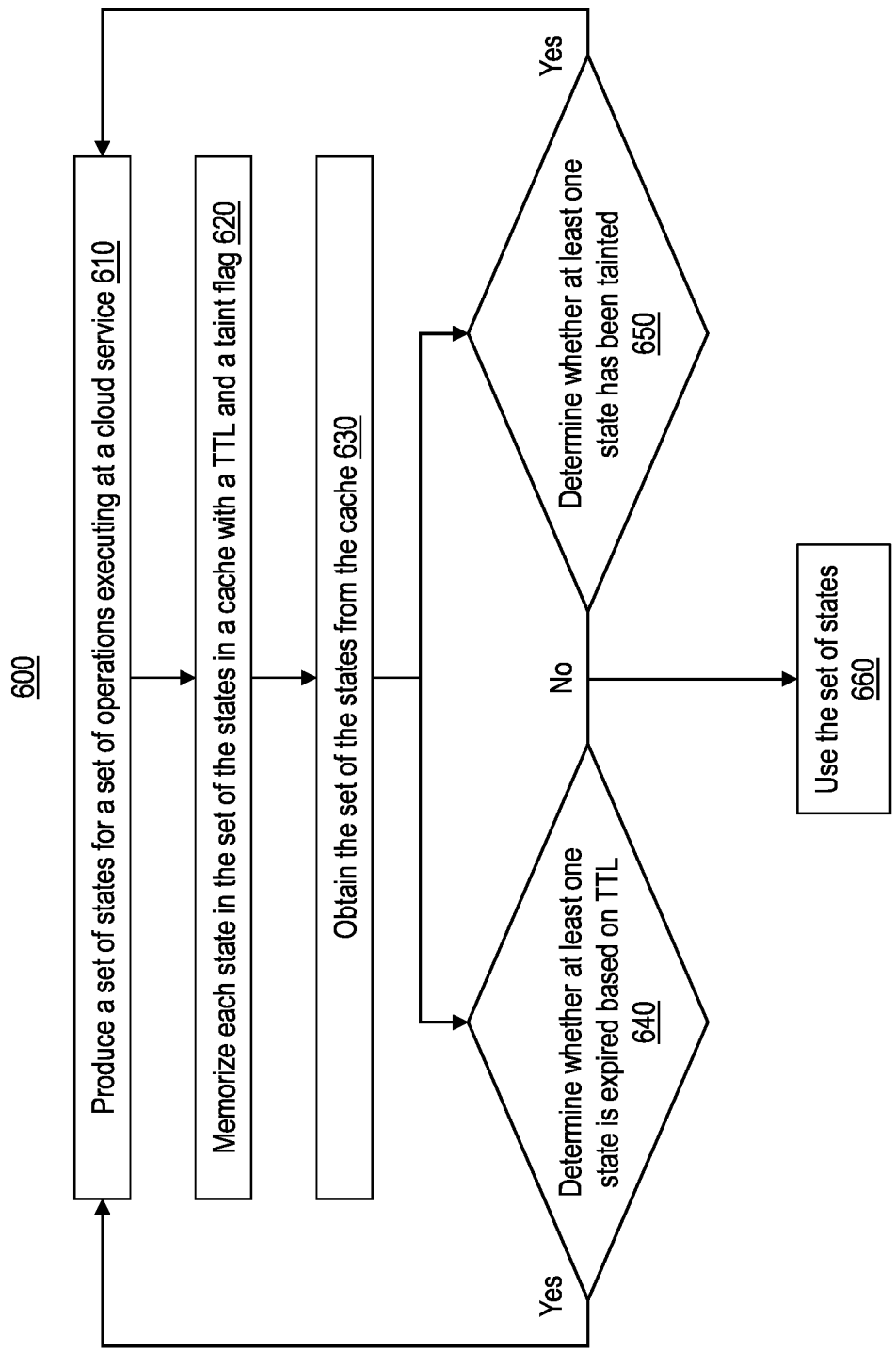
FIG. 6 illustrates a flowchart of a method 600 for obtaining a current state of a cloud service.

FIG. 6 illustrates a flowchart of a method 600 for obtaining a current state of a cloud service, which corresponds to act 410 of FIG. 4. The method 600 includes producing a first set of states for a first set of operations that are executing at the cloud service (act 610) and memorizing each state in the first set of states in a first cache with a TTL and a taint flag (act 620). The method 600 further includes obtaining the first set of states from the first cache (act 630), and determining whether at least one state in the first set of states is expired based on the TTL (act 640) and/or whether the at least one state in the first set of states has been tainted based on the taint flag (act 650). In response to determining that the state in the first set of states is expired or tainted, the first set of states are used as the current state of the cloud service (act 660). Otherwise, acts 610-660 are repeated again. For example, when the at least one state in the first set of states is expired or tainted, a new state for a corresponding operation is produced (act 610), the new state is memorized in the first cache with a new TTL and a new taint flat (act 620), and the updated set of states are obtained from the first cache (act 630).

In some embodiments, a goal state is a current state of a second cloud service. For example, an existing cloud service has been deployed an existing region, and the same cloud service now needs to be deployed in a new region. The existing cloud service is an example of a second cloud service. The method 600 can also be implemented for obtaining the goal state, which corresponds to act 420 of FIG. 4. In such a case, obtaining the goal state includes producing a second set of states for a second set of operations that are executing at the second cloud service (act 610) and memorizing each state in the second set of states in a second cache with a TTL and a taint flag (act 620). The method 600 further includes obtaining the second set of states from the second cache (act 630), and determining whether at least one state in the second set of states is expired based on the TTL (act 640) and/or whether the at least one state in the second set of states has been tainted based on the taint flag (act 650). In response to determining that the state in the first set of states is expired or tainted, the second set of states are used as the goal state. Otherwise, acts 610-650 are repeated again. For example, when the at least one state in the second set of states is expired or tainted, a new state for a corresponding operation is produced (act 610), the new state is memorized in the second cache with a new TTL and a new taint flat (act 620), and the updated set of states are obtained from the second cache (act 630).

Finally, because the principles described herein may be performed in the context of a computer system, some introductory discussion of a computer system will be described with respect to FIG. 7.

Computer systems are now increasingly taking a wide variety of forms. Computer systems may, for example, be hand-held devices, appliances, laptop computers, desktop computers, mainframes, distributed computer systems, data centers, or even devices that have not conventionally been considered a computer system, such as wearables (e.g., glasses). In this description and in the claims, the term "computer system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computer system. A computer system may be distributed over a network environment and may include multiple constituent computer systems.

Figure 7:
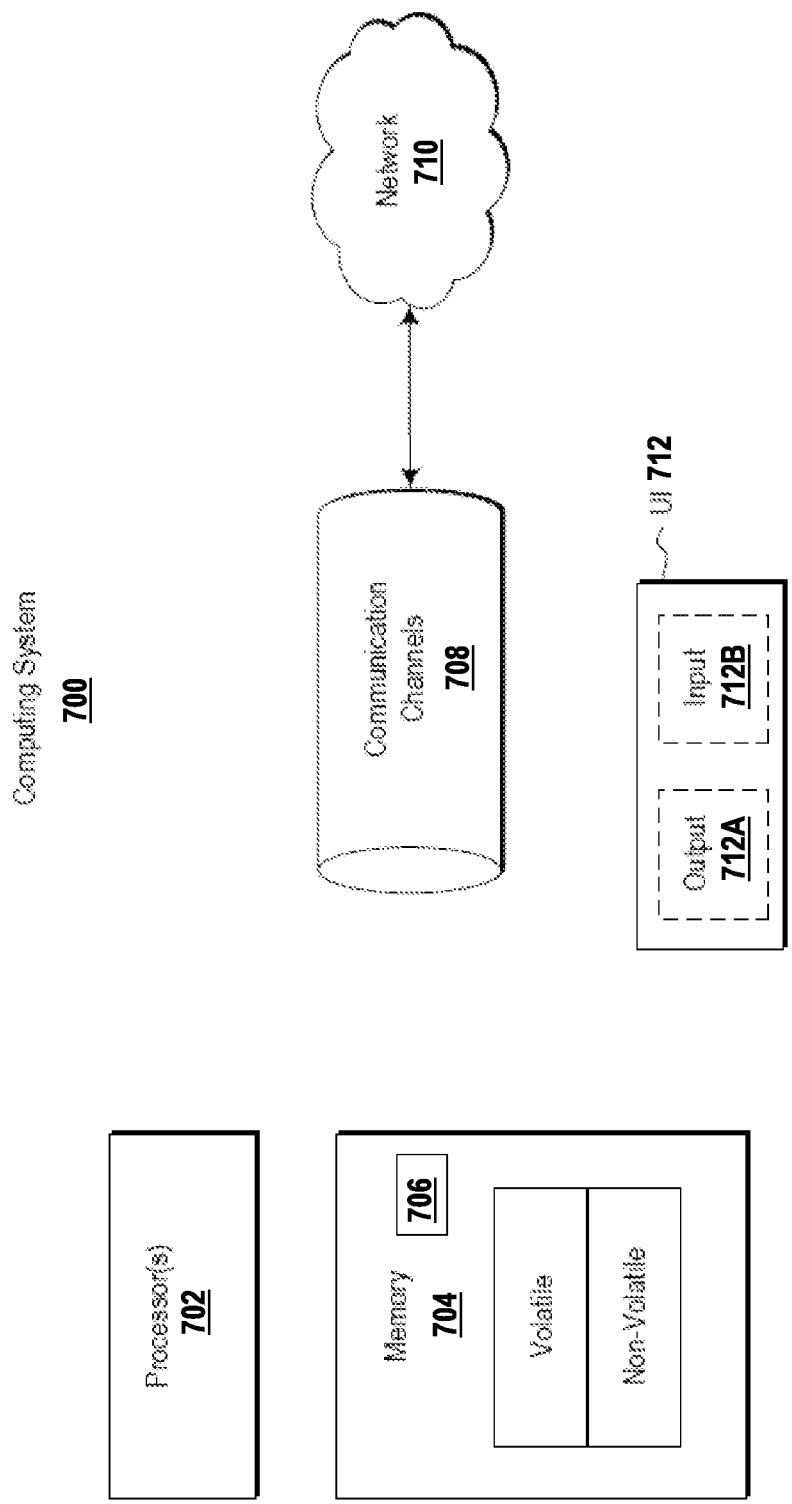
FIG. 7 illustrates an example computer system in which the principles described herein may be employed.

As illustrated in FIG. 7, in its most basic configuration, a computer system 700 typically includes at least one hardware processing unit 702 and memory 704. The processing unit 702 may include a general-purpose processor and may also include a field-programmable gate array (FPGA), an application-specific integrated circuit (ASIC), or any other specialized circuit. The memory 704 may be physical system memory, which may be volatile, non-volatile, or some combination of the two. The term "memory" may also be used herein to refer to non-volatile mass storage such as physical storage media. If the computer system is distributed, the processing, memory, and/or storage capability may be distributed as well.

The computer system 700 also has thereon multiple structures often referred to as an "executable component". For instance, memory 704 of the computer system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computer system, whether such an executable component exists in the heap of a computer system, or whether the executable component exists on computer-readable storage media.

In such a case, one of ordinary skill in the art will recognize that the structure of the executable component exists on a computer-readable medium such that, when interpreted by one or more processors of a computer system (e.g., by a processor thread), the computer system is caused to perform a function. Such a structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computer systems. If such acts are implemented in software, one or more processors (of the associated computer system that performs the act) direct the operation of the computer system in response to having executed computer-executable instructions that constitute an executable component. For example, such computer-executable instructions may be embodied in one or more computer-readable media that form a computer program product. An example of such an operation involves the manipulation of data. If such acts are implemented exclusively or near-exclusively in hardware, such as within an FPGA or an ASIC, the computer-executable instructions may be hardcoded or hard-wired logic gates. The computer-executable instructions (and the manipulated data) may be stored in the memory 704 of the computer system 700. Computer system 700 may also contain communication channels 708 that allow the computer system 700 to communicate with other computer systems over, for example, network 710.

While not all computer systems require a user interface, in some embodiments, the computer system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, holograms, and so forth. Examples of input mechanisms 712B might include, for instance, microphones, touchscreens, holograms, cameras, keyboards, mouse or other pointer input, sensors of any type, and so forth.

Embodiments described herein may comprise or utilize a special purpose or general-purpose computer system, including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computer system.

A "network" is defined as one or more data links that enable the transport of electronic data between computer systems and/or modules and/or other electronic devices. When information is transferred or provided over a network or another communications connection (either hard-wired, wireless, or a combination of hard-wired or wireless) to a computer system, the computer system properly views the connection as a transmission medium. Transmissions media can include a network and/or data links that can be used to carry desired program code means in the form of computer-executable instructions or data structures and which can be accessed by a general-purpose or special-purpose computer system. Combinations of the above should also be included within the scope of computer-readable media.

Further, upon reaching various computer system components, program code means in the form of computer-executable instructions or data structures can be transferred automatically from transmission media to storage media (or vice versa). For example, computer-executable instructions or data structures received over a network or data link can be buffered in RANI within a network interface module (e.g., a "NIC"), and then eventually transferred to computer system RANI and/or to less volatile storage media at a computer system. Thus, it should be understood that storage media can be included in computer system components that also (or even primarily) utilize transmission media.

Computer-executable instructions comprise, for example, instructions and data which, when executed at a processor, cause a general-purpose computer system, special purpose computer system, or special purpose processing device to perform a certain function or group of functions. Alternatively or in addition, the computer-executable instructions may configure the computer system to perform a certain function or group of functions. The computer-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, data centers, wearables (such as glasses) and the like. The invention may also be practiced in distributed system environments where local and remote computer systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The computer systems of the remaining figures include various components or functional blocks that may implement the various embodiments disclosed herein, as will be explained. The various components or functional blocks may be implemented on a local computer system or may be implemented on a distributed computer system that includes elements resident in the cloud or that implement aspect of cloud computing. The various components or functional blocks may be implemented as software, hardware, or a combination of software and hardware. The computer systems of the remaining figures may include more or less than the components illustrated in the figures, and some of the components may be combined as circumstances warrant. Although not necessarily illustrated, the various components of the computer systems may access and/or utilize a processor and memory, such as processing unit 702 and memory 704, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:
    one or more processors; and
    one or more computer-readable media having stored thereon computer-executable instructions that are structured such that, when the computer-executable instructions are executed by the one or more processors, the computer system is configured to:
        perform a reconciliation process with respect to a current state of a cloud service and a goal state of the cloud service, performing the reconciliation process comprising:
            obtaining the current state of the cloud service, the current state containing one or more first resources that have been deployed at the cloud service;
            obtaining the goal state of the cloud service, the goal state containing one or more second resources that are required to set up and run the cloud service;
            evaluating the current state against the goal state to generate a reconciliation plan that comprises a plurality of operations;
            starting execution of the reconciliation plan at the cloud service including performing at least one of the plurality of operations in the reconciliation plan; and
            after starting execution of the reconciliation plan at the cloud service:
                obtaining a first set of operations that are executing at the cloud service;
                obtaining a second set of operations that are contained in the reconciliation plan;
                identifying a third set of operations that are in the first set of operations but not in the second set of operations; and
                cancelling the third set of operations at the cloud service; and
        in response to detecting an event, reperform the reconciliation process again such that one or more of the current state of the cloud service, the goal state of the cloud service, or the reconciliation plan changes, wherein by repeatedly performing the reconciliation process, the cloud service moves step by step towards the goal state.

2. The computer system of claim 1, wherein detecting the event includes detecting at least one of (1) at least one of the plurality of operations is finished, (2) a new goal state is identified, or (3) a predetermined time has passed.

3. The computer system of claim 2, wherein, in response to identifying a new goal state before a current reconciliation process is completed, the computer system is configured to:
    abort the current reconciliation process; and
    start a new reconciliation process to reconcile a new current state of the cloud service with the new goal state.

4. The computer system of claim 1, wherein evaluating the current state against the goal state includes:
    comparing a first set of resources that have been deployed at the cloud service with a second set of resources contained in the goal state to identify (1) a third set of resources that have not been deployed at the cloud service, but contained in the goal state, (2) a fourth set of resources that have been deployed at the cloud service, but not contained in the goal state, or (3) a fifth set of resources that have been deployed at the cloud service, and also contained in the goal state;
    identifying the plurality of operations based on the third set of resources, the fourth set of resources, or the fifth set of resources;
    evaluating the plurality of operations to identify dependencies thereof;
    generating a reconciliation graph based on the plurality of operations and the dependencies thereof; and
    identifying a subset of operations in the reconciliation graph that are without any dependency.

5. The computer system of claim 4, wherein executing the reconciliation plan at the cloud service includes launching the subset of operations at the cloud service asynchronously.

6. The computer system of claim 5, wherein asynchronously executing the subset of operations at the cloud service further includes:
    tracking and maintaining a state for each operation in the subset of operations at the cloud service.

7. The computer system of claim 4, wherein:
    the reconciliation graph is a directed acyclic graph (DAG) having a plurality of nodes and a plurality of edges,
    each of the plurality of nodes of the DAG is one of create, read, update, or delete (CRUD) operations, and
    each of the plurality of edges of the DAG is a dependency between operations connected thereby.

8. The computer system of claim 1, wherein performing the reconciliation process also comprises, after starting execution of the reconciliation plan at the cloud service:
    identifying a fourth set of operations that are common in both the first set of operations and the second set of operations; and
    keeping the fourth set of operations.

9. The computer system of claim 8, wherein the goal state is a current state of a second cloud service.

10. The computer system of claim 9, wherein the computer system is further configured to cause the second cloud service to:
    produce a second set of states for a second subset of operations executing at the second cloud service; and
    memorize the second set of states in a second cache, a state for each of the second subset of operations being associated with a time-to-live and a taint flag.

11. The computer system of claim 10, wherein obtaining the goal state includes:
    obtaining the second set of states from the second cache;
    determining whether at least one state in the second set of states has been expired based on the time-to-live or has been tainted based on the taint flag; and
    in response to determining that at least one state in the second set of states has been expired or tainted, causing the second cloud service to produce a new state for a corresponding operation and memorize the new state in the second cache.

12. The computer system of claim 1, wherein the computer system is further configured to cause the cloud service to:
    produce a first set of states for a first subset of operations that are executing at the cloud service; and memorize the first set of states in a first cache, a state for each operation in the first subset of operations being associated with a time-to-live and a taint flag.

13. The computer system of claim 12, wherein obtaining the current state includes:
   obtaining the first set of states from the first cache;
   determining whether at least one state in the first set of states has been expired based on the time-to-live or has been tainted based on the taint flag; and
   in response to determining that at least one state in the first set of states has been expired or tainted, producing a new state for a corresponding operation and memorizing the new state in the first cache.

14. The computer system of claim 13, wherein the computer system is further configured to taint the taint flags of the first set of states that would be impacted by launching the at least one operation in the plurality of operations.

15. A method implemented at a computer system for reconciliation of a current state of a cloud service, the method comprising:
   performing a reconciliation process with respect to a current state of a cloud service and a goal state of the cloud service, performing the reconciliation process comprising:
      obtaining the current state of the cloud service, the current state containing one or more first resources that have been deployed at the cloud service;
      obtaining the goal state of the cloud service, the goal state containing one or more second resources required to set up and run the cloud service;
      evaluating the current state against the goal state to generate a reconciliation plan that comprises a plurality of operations;
      starting execution of the reconciliation plan at the cloud service including performing at least one of the plurality of operations in the reconciliation plan; and
      after starting execution of the reconciliation plan at the cloud service:
         obtaining a first set of operations that are executing at the cloud service;
         obtaining a second set of operations that are contained in the reconciliation plan;
         identifying a third set of operations that are in the first set of operations but not in the second set of operations; and
         cancelling the third set of operations at the cloud service; and
   in response to detecting an event, reperforming the reconciliation process again such that one or more of the current state of the cloud service, the goal state of the cloud service, or the reconciliation plan changes, wherein by repeatedly performing the reconciliation process, the cloud service moves step by step towards the goal state.

16. The method of claim 15, wherein detecting the event includes detecting at least one of (1) at least one of the plurality of operations is finished, (2) a new goal state is identified, or (3) a predetermined time has passed.

17. The method of claim 15, the method further comprising:
   in response to detecting a new goal state before a current reconciliation process is completed, aborting the current reconciliation process, and
   reconciling a new current state of the cloud service with the new goal state.

18. The method of claim 15, wherein evaluating the current state against the goal state includes:
   comparing a first set of resources that have been deployed at the cloud service with a second set of resources contained in the goal state to identify (1) a third set of resources that have not been deployed at the cloud service, but contained in the goal state, (2) a fourth set of resources that have been deployed at the cloud service, but not contained in the goal state, or (3) a fifth set of resources that have been deployed at the cloud service, and also contained in the goal state;
   identifying the plurality of operations based on the third set of resources, the fourth set of resources, or the fifth set of resources;
   evaluating the plurality of operations to identify dependencies thereof;
   generating a reconciliation graph based on the plurality of operations and the dependencies thereof; and
   identifying a subset of operations in the reconciliation graph that are without any dependency.

19. The method of claim 18, wherein:
   the reconciliation graph is a directed acyclic graph (DAG) having a plurality of nodes and a plurality of edges,
   each of the plurality of nodes of the DAG is one of create, read, update, or delete (CRUD) operations, and
   each of the plurality of edges of the DAG is a dependency between operations connected thereby.

20. A computer program product comprising one or more hardware storage devices having stored thereon computer-executable instructions that are structured such that, when the computer-executable instructions are executed by one or more processors of a computer system, the computer-executable instructions configure the computer system to perform at least:
   perform a reconciliation process with respect to a current state of a cloud service and a goal state of the cloud service, performing the reconciliation process comprising:
      obtaining the current state of the cloud service, the current state containing one or more first resources that have been deployed at the cloud service;
      obtaining the goal state of the cloud service, the goal state containing one or more second resources required to set up and run the cloud service;
      evaluating the current state against the goal state to generate a reconciliation plan that comprises a plurality of operations;
      starting execution of the reconciliation plan at the cloud service including performing at least one of the plurality of operations in the reconciliation plan; and
      after starting execution of the reconciliation plan at the cloud service:
         obtaining a first set of operations that are executing at the cloud service;
         obtaining a second set of operations that are contained in the reconciliation plan;
         identifying a third set of operations that are in the first set of operations but not in the second set of operations; and
         cancelling the third set of operations at the cloud service; and
   in response to detecting an event, reperform the reconciliation process again such that one or more of the current state of the cloud service, the goal state of the cloud service, or the reconciliation plan changes, wherein by repeatedly performing the reconciliation process, the cloud service moves step by step towards the goal state.

* * * * *